(12) United States Patent
Jung et al.

(10) Patent No.: US 8,049,971 B2
(45) Date of Patent: Nov. 1, 2011

(54) LENS DRIVING UNIT AND CAMERA MODULE COMPRISING THE SAME

(75) Inventors: Tae-hoon Jung, Changwon (KR); Dae-kyung Kim, Changwon (KR); In-hwan Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 110 days.

(21) Appl. No.: 12/425,477

(22) Filed: Apr. 17, 2009

(65) Prior Publication Data
US 2010/0091392 A1 Apr. 15, 2010

(30) Foreign Application Priority Data
Oct. 15, 2008 (KR) .................. 10-2008-0101128

(51) Int. Cl.
*G02B 15/14* (2006.01)
(52) U.S. Cl. .................. 359/694; 359/824; 359/819
(58) Field of Classification Search .................. 359/824, 359/819
See application file for complete search history.

(56) References Cited

U.S. PATENT DOCUMENTS

| | | |
|---|---|---|
| 6,710,950 B2 | 3/2004 | Rouvinen et al. |
| 2006/0119218 A1* | 6/2006 | Doshida et al. .......... 310/323.01 |
| 2006/0274186 A1 | 12/2006 | Machida |
| 2008/0144201 A1* | 6/2008 | Koc et al. ..................... 359/824 |

FOREIGN PATENT DOCUMENTS
KR  10-2004-0027753 A  4/2004
KR  10-0817033 B1  3/2008

OTHER PUBLICATIONS
Office Action established for CN200910140361.5.
* cited by examiner Primary Examiner — Scott J Sugarman
Assistant Examiner — James Jones
(74) Attorney, Agent, or Firm — Drinker Biddle & Reath LLP

(57) ABSTRACT

Provided are a lens driving unit that generates a precise linear motion in a spatially limited structure by using a bending vibration piezoelectric motor having a new structure, and a camera module comprising the lens driving unit. The lens driving unit includes: a lens carrier supporting a lens and comprising a guide axis exposed at least partially to the outside and extending in a direction substantially perpendicular to the lens; and a piezoelectric driving unit having a center portion contacting the guide axis according to a bending motion of a piezoelectric element and moving the lens carrier in a direction in which the guide axis extends.

18 Claims, 9 Drawing Sheets

LENS DRIVING UNIT AND CAMERA MODULE COMPRISING THE SAME

CROSS-REFERENCE TO RELATED PATENT APPLICATION

This application claims the benefit of Korean Patent Application No. 10-2008-0101128, filed on Oct. 15, 2008, in the Korean Intellectual Property Office, the disclosures of which are incorporated herein in their entirety by reference.

BACKGROUND OF THE INVENTION

1. Field of the Invention

The present invention relates to a lens driving unit and a camera module comprising the same, and more particularly, to a lens driving unit that generates a precise linear motion in a spatially limited structure by using a bending vibration piezoelectric motor so as to perform an auto-focusing (AF) function or a zooming function, and a camera module comprising the lens driving unit.

2. Description of the Related Art

Recently portable electronic devices have increasingly employed a camera module having an auto-focusing (AF) function or a zooming function. Cellular phones employ small and thin camera modules since the thicker the camera modules are, the thicker the cellular phones are.

A lens barrel supporting a lens is moved along a guide unit in order to perform the AF function or the zooming function. A stepping motor or a piezoelectric motor may be used as a driving unit for moving the lens barrel along the guide unit. The stepping motor is driven by a step waveform changed from an input pulse, is controlled and operated by an electronic circuit by using direct current power, and shows a fast response to a location control in a short distance.

However, the stepping motor needs a lot of components due to the sizes of a reduction gear, a connecting area, and itself, which may result in increasing the size of an operation module. Also, the increase in the number of components may increase manufacturing cost.

SUMMARY OF THE INVENTION

In an embodiment, the present invention provides a lens driving unit that generates a precise linear motion in a spatially limited structure by using a bending vibration piezoelectric motor having a new structure, and a camera module comprising the lens driving unit. The structure disclosed in the various embodiments of the present invention thereby also provides a means for supporting a lens and moving the lens along an axis substantially perpendicular to the face of the lens with a bending motion.

According to an aspect of the present invention, there is provided a lens driving unit comprising: a lens carrier supporting a lens and comprising a guide axis exposed at least partially to the outside and extending in a direction substantially perpendicular to the lens; and a piezoelectric driving unit having a center portion contacting the guide axis according to a bending motion of a piezoelectric element and moving the lens carrier in a direction in which the guide axis extends.

The piezoelectric driving unit may comprise: a first and second piezoelectric elements extending in a direction substantially perpendicular to the guide axis; an elastic element disposed between the first and second piezoelectric elements and extending in the direction substantially perpendicular to the guide axis; and a contacting unit disposed in a center portion of the elastic element and contacting the guide axis. The first and second piezoelectric elements substantially may have the same length, and wherein the elastic element is longer than the first piezoelectric element.

The lens driving unit may further comprise a driving unit holder supporting both ends of the elastic element. During a bending motion of the elastic element, a part of the elastic element supported by the driving unit holder slidably may contact a part of the driving unit holder supporting the elastic element. In addition, the lens driving unit may comprise at least one side spring formed on the driving unit holder so as to elastically maintain contact of the contacting unit to the guide axis. Alternatively or in addition, the lens driving unit may comprise a lower spring formed on the first piezoelectric element or the second piezoelectric element so as to provide a restoring force with regard to the bending motion of the piezoelectric element.

In various embodiments the lens driving unit includes also a ball bearing spaced apart from the guide axis on an exterior surface of the lens carrier and guiding the lens carrier in the direction in which the guide axis extends and a ball groove spaced apart from the guide axis on the exterior surface of the lens carrier and guiding the ball bearing in the direction in which the guide axis extends. The ball groove may be symmetrical to the guide axis about the lens carrier. There may be a plurality of ball bearings and a plurality of ball grooves in some embodiments of the invention.

In several embodiments, the piezoelectric driving unit moves the lens carrier according to a repetitive bending motion of the piezoelectric element.

In order to detect the position of the lens carrier with respect to a module base, some embodiments of the present invention include an extension wing extending from the exterior surface of the lens carrier; and a reflective plate formed on the bottom surface of the extension wing and detecting the movement of the lens carrier with a sensor formed separate from the reflective plate.

According to another aspect of the present invention, there is provided a camera module comprising: a lens carrier supporting a lens and comprising a guide axis exposed at least partially to the outside and extending in a direction substantially perpendicular to the lens; a piezoelectric driving unit having a center portion contacting the guide axis according to a bending motion of a piezoelectric element and moving the lens carrier in a direction in which the guide axis extends; and a module base supporting the lens carrier to allow the lens carrier to move in at least one direction.

The camera module may further comprise a cover coupled to the module base and covering the lens carrier and the piezoelectric driving unit; a circuit substrate coupled to an opposite surface of the module base to which the cover is coupled; and an image picking element formed on a surface of the circuit substrate to which the module base is coupled.

The camera module may further comprise an extension wing extending from the exterior surface of the lens carrier; a reflective plate formed on the bottom surface of the extension wing; and a sensor formed in a location of the module base corresponding to the reflective plate and detecting the movement of the lens carrier.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
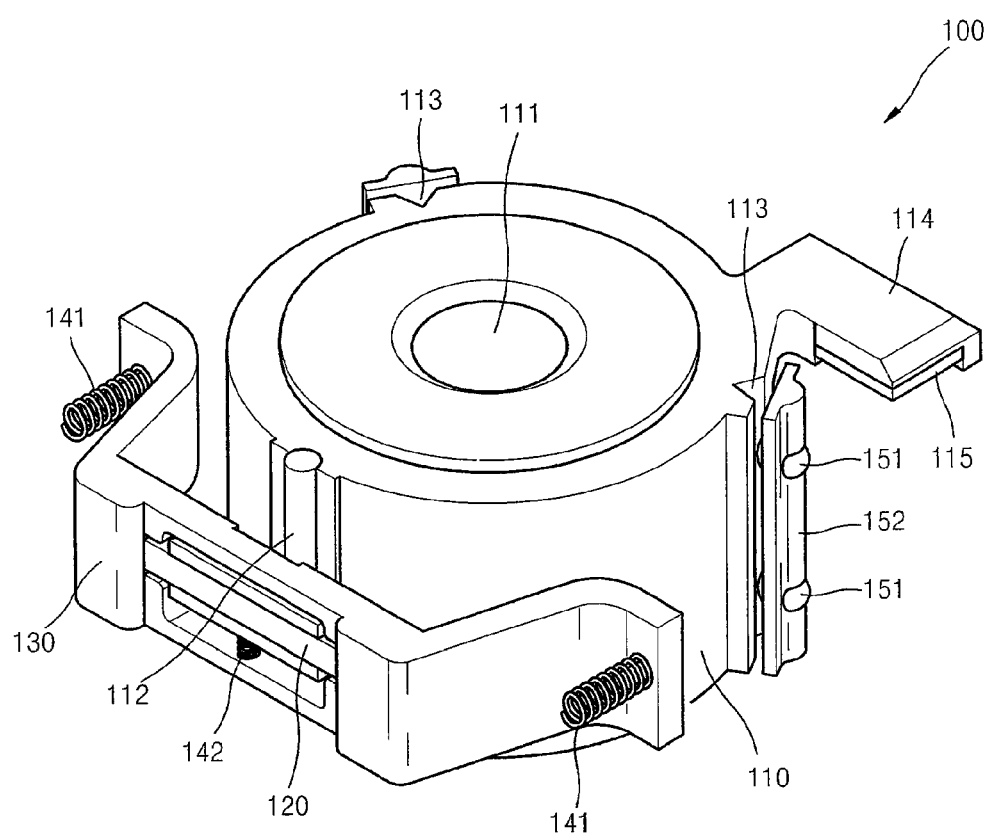
FIG. 1 is a perspective view of a lens driving unit according to an embodiment of the present invention.
Figure 2:
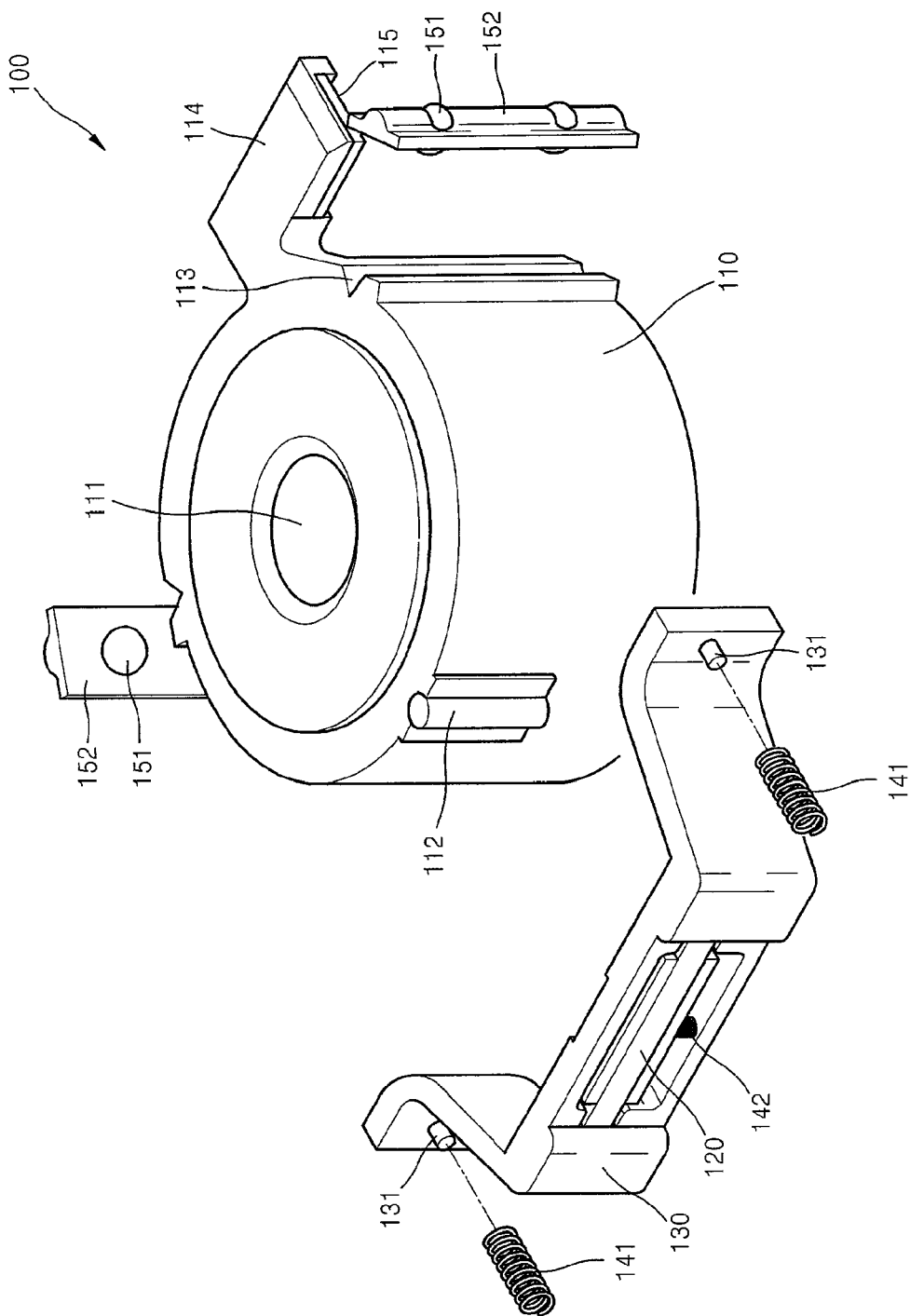
FIG. 2 is an exploded perspective view of the lens driving unit shown in FIG. 1, according to an embodiment of the present invention.
Figure 3:
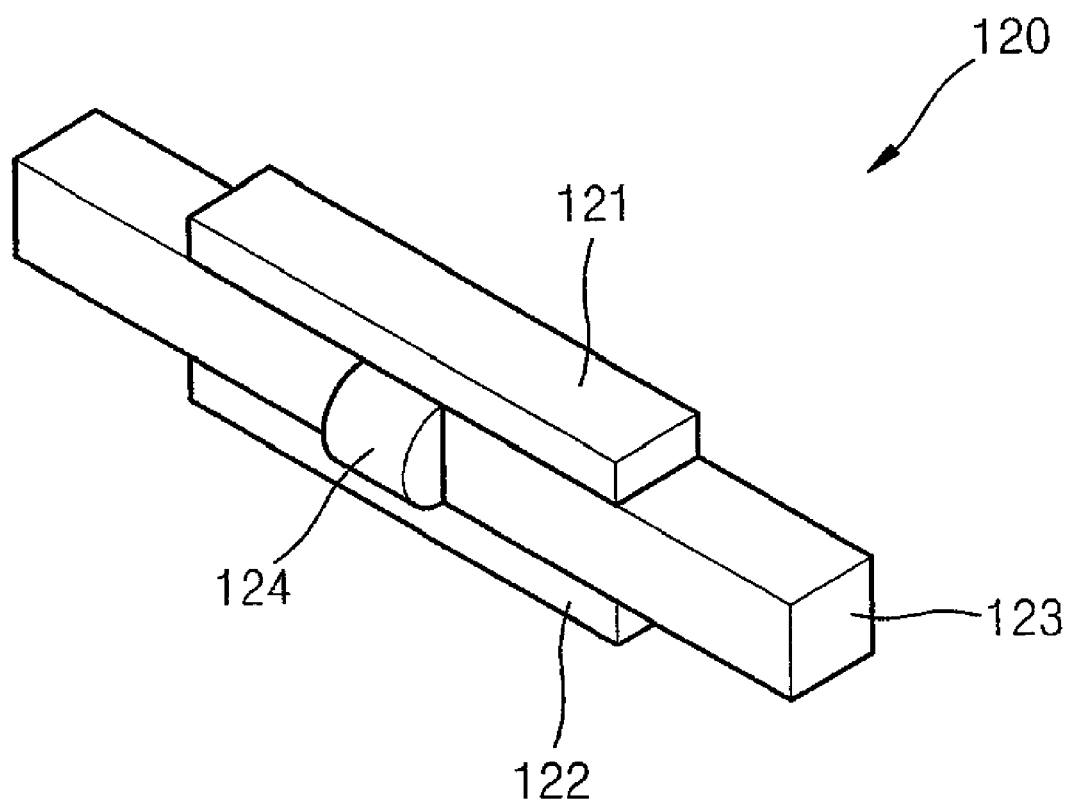
FIG. 3 is a perspective view of a piezoelectric driving unit of the lens driving unit shown in FIG. 1, according to an embodiment of the present invention.

FIG. 1 is a perspective view of a lens driving unit 100 according to an embodiment of the present invention. FIG. 2 is an exploded perspective view of the lens driving unit 100 shown in FIG. 1, according to an embodiment of the present invention. FIG. 3 is a perspective view of a piezoelectric driving unit 120 of the lens driving unit 100 shown in FIG. 1, according to an embodiment of the present invention.

Referring to FIGS. 1 through 3, the lens driving unit 100 may comprise a lens carrier 110 and the piezoelectric driving unit 120.

The lens carrier 110 for supporting a lens 111 inside thereof may comprise a guide axis 112. The guide axis 112 may be at least partially exposed to the outside and extend in a direction substantially perpendicular to the lens 111.

The guide axis 112 may be integrally attached to or disposed in the lens carrier 110 so that the guide axis 112 can extend in a length direction of the lens carrier 110 on the exterior surface of the lens carrier 110.

The piezoelectric driving unit 120 may move the guide axis 112 in a direction in which the guide axis 112 extends since a center portion of the piezoelectric driving unit 120 contacts the guide axis 112, according to the bending motions of first and second piezoelectric elements 121 and 122.

Therefore, since the piezoelectric driving unit 120 partially contacts the guide axis 112 and the first and second piezoelectric elements 121 and 122 repeatedly perform a bending motion, the piezoelectric driving unit 120 may move the lens carrier 110 in an axial direction of the lens 111 according to repetitive friction and sliding motions between a part of the piezoelectric driving unit 120 and the guide axis 112.

In the present embodiment, a bimorph type piezoelectric actuator may be used as the piezoelectric driving unit 120. In this regard, the piezoelectric driving unit 120 may comprise two sheets of lead zirconate titanate and one sheet of a metal elastic body disposed between the two sheets of lead zirconate titanate. The first and second piezoelectric elements 121 and 122 perform the bending motion according to contraction and expansion of the two sheets of lead zirconate titanate. The piezoelectric driving unit 120 may move the lens carrier 110 according to a linear motion and an inertia motion followed by the bending motion.

In this regard, the piezoelectric driving unit 120 may comprise the first and second piezoelectric elements 121 and 122, an elastic element 123, and a contacting unit 124.

The first and second piezoelectric elements 121 and 122 may extend in a direction substantially perpendicular to the guide axis 112. The contacting unit 124 is disposed in the center portion of the elastic element 123 and may contact the guide axis 112.

The elastic element 123 may be disposed between the first and second piezoelectric elements 121 and 122, and may extend in the direction substantially perpendicular to the guide axis 112. In the present embodiment, the first piezoelectric element 121 may be disposed on the upper surface of the elastic element 123, and the second piezoelectric element 122 may be disposed on the lower surface of the elastic element 123.

The first and second piezoelectric elements 121 and 122 substantially may have the same length. The elastic element 123 may be disposed between the first and second piezoelectric elements 121 and 122, may extend longer than the first piezoelectric element 121 or the second piezoelectric element 122.

The first and second piezoelectric elements 121 and 122 and the elastic element 123 substantially may have the same width. The piezoelectric driving unit 120 may be formed as a bimorph type thin belt and be disposed between the inner surface of a module base 200 shown in FIG. 10 and the exterior surface of the lens carrier 110 having a cylindrical shape. In more detail, since the bimorph type piezoelectric actuator is used as the piezoelectric driving unit 120 of the lens carrier 110, the piezoelectric driving unit 120 may be disposed between the exterior surface of the lens carrier 110 and the inner surface of the module base 200 with respect to the lens carrier 110 disposed in the module base 200.

Therefore, the lens driving unit 100 may comprise the piezoelectric driving unit 120 of the lens carrier 110 in a limited space between the exterior surface of the lens carrier 110 and the inner surface of the module base 200, thereby utilizing space in the lens driving unit 100 efficiently.

The lens driving unit 100 may further comprise a driving unit holder 130 for supporting both ends of the elastic element 123. The driving unit holder 130 may be mounted on the module base 200 that supports the lens driving unit 100, support the lens carrier 100 with the piezoelectric driving unit 120, and allow the lens driving unit 100 to be moved with respect to the module base 200.

In more detail, both ends of the piezoelectric driving unit 120 are supported by the driving unit holder 130, and the first and second piezoelectric elements 121 and 122 are expanded or contracted by an application of power. The piezoelectric driving unit 120 performs the bending motion and thus the center portion thereof performs a straight motion upward or downward along the guide axis 112.

The contacting unit 124 is disposed in the center portion of the elastic element 123 and contacts the guide axis 112. Therefore, the bending motion of the piezoelectric driving unit 120 results in the straight motion of the contacting unit 124, so that the guide axis 112 contacting the contacting unit 124 is moved.

In this regard, the lens driving unit 100 may comprise two side springs 141 and a lower spring 142 so that the lens carrier 110 can be elastically supported by the piezoelectric driving unit 120.

The side springs 141 may be disposed on the driving unit holder 130 so that the contacting unit 124 maintains contact with the guide axis 112. The side springs 141 may be disposed between the inner surface of the module base 200 and the driving unit holder 130 so that the exterior surface of the lens carrier 110 can be elastically supported by the piezoelectric driving unit 120.

The driving unit holder 130 may comprise two first members 131, which are projection units that can be inserted into the side springs 141, in a location where the side springs 141 are disposed.

The lower spring 142 may be disposed on the first piezoelectric element 121 or the second piezoelectric element 122 so as to provide a restoring force with regard to the bending motion of the piezoelectric driving unit 120. In the present embodiment, the lower spring 142 may be disposed under the second piezoelectric element 122. The driving unit holder 130 may further comprise a second member 132, which is a projection unit that is inserted into the lower spring 142, in a location where the lower spring 142 is disposed. The second member 132 is formed to be projected from the surface where the second piezoelectric element 122 is disposed.

The lower spring 142 may be disposed between the driving unit holder 130 and the second piezoelectric element 122 and provides the restoring force upward when the piezoelectric driving unit 120 performs a downward bending motion. When the piezoelectric driving unit 120 performs an upward bending motion, the lower spring 142 is extended and provides the restoring force downward.

Also, the lens driving unit 100 may further comprise ball bearings 151 that are spaced apart from the guide axis 112 on the exterior surface of the lens carrier 110 and guide the lens carrier 110 in the direction in which the guide axis 112 extends. In more detail, when the lens carrier 110 moves in an axial direction of the lens 111, the lens carrier 110 may be guided by the ball bearings 151 that are spaced apart from the guide axis 112 in the lens driving unit 100.

The ball bearings 151 may move along two or more axes so as to stably support the lens carrier 110 in the module base 200 and more stably maintain a horizontal level of the lens 111. The ball bearings 151 may be spaced apart from each other with respect to an axis.

The lens driving unit 100 may comprise a plurality of ball bearing grooves 113 that are spaced apart from the guide axis 112 on the exterior surface of the lens carrier 110 and extend in the direction in which the guide axis 112 extends so as to guide the ball bearings 151.

In more detail, when the lens carrier 110 moves with respect to the module base 200, the lens carrier 110 may point-contact with the module base 200 via the ball bearings 151 that roll along the ball bearing grooves 113. The plurality of ball bearing grooves 113 are spaced apart from the guide axis 112 and extend in the direction in which the guide axis 112 extends so that the lens carrier 110 in the module base 200 is stably supported and the horizontal level of the lens 111 is more stably maintained.

If a single ball bearing groove 113 is formed so that the lens carrier 110 in the module base 200 is stably supported and the horizontal level of the lens 111 is more stably maintained, the single ball bearing groove 113 may be formed opposite to the guide axis 112 so as to be symmetrical with the guide axis 112 about the lens carrier 110. The plurality of ball bearing grooves 113 may be symmetrical to each other about the guide axis 112. The ball bearing grooves 113 may have V-shaped cross-sections so as to efficiently support the ball bearings 151.

The ball bearings 151 may be rotatably fixed to the inner surface of the module base 200. In this regard, a plurality of ball guides 152 may be disposed between the module base 200 and the lens carrier 110, and be used for the ball bearings 151 to rotate on the inner surface of the module base 200.

The ball guides 152 may be formed with insertion holes into which the ball bearings 151 may be inserted such that part of the surface of the ball bearings 151 faces toward the lens carrier 110. The ball guides 152 may be disposed in a location where the ball bearing grooves 113 are formed. Thus, the number of ball guides 152 may be the same as the number of ball bearing grooves 113.

Meanwhile, a location of the lens carrier 110 with regard to the module base 200 is necessarily detected. In this regard, a reflective plate 115 is formed on the lens carrier 110, and the module base 200 may comprise a sensor for recognizing a location of the reflective plate 115.

The lens carrier 110 comprises an extension wing 114 that extends from the exterior surface of the lens carrier 110, and the reflective plate 115 may be formed on the bottom surface of the extension wing 114. The reflective plate 115 may be used to sense the movement of the lens carrier 110 with the sensor formed separate from the reflective plate 115. The sensor may be formed in the module base 200. The sensor may be a photo reflector 210 comprising a light emitting unit and a light receiving unit.

The light emitting unit of the photo reflector 210 formed in the module base 200 emits light, the reflective plate 115 reflects the light, and the light receiving unit receives the light so that the location of the reflective plate 115 with respect to the photo reflector 210 is recognized. Thus, the relative location of the lens carrier 110 with respect to the module base 200 may be recognized with the photo reflector 210.

In particular, the reflective plate 115 is horizontally disposed on the extension wing 114, and the photo reflector 210 may be horizontally disposed in a location corresponding to the reflective plate 115, so that the location of the reflective plate 115 with respect to the photo reflector 210 is recognized according to the intensity of the light received by the light receiving unit of the photo reflector 210.

In this regard, if the lens carrier 110 moves and thus the reflective plate 115 is away from the photo reflector 210, the intensity of the light received by the light receiving unit of the photo reflector 210 is reduced, and if the reflective plate 115 is closer to the photo reflector 210, the intensity of the light received by the light receiving unit is increased.

In the lens driving unit 100, the lens carrier 110 is elastically supported by the side springs 141 and is guided by the ball bearings 151 and the ball bearing grooves 113, so that the lens carrier 110 is stably supported in the module base 200 and the horizontal level of the lens 111 is more stably maintained.

In more detail, the guide axis 112 that is driven by the piezoelectric driving unit 120 and in the lens carrier 110 is symmetrical with the ball bearing grooves 113 and the lens carrier 110 is supported by the module base 200, so that the lens carrier 110 is horizontal to an image picking element 500 formed on the bottom surface of the module base 200 during a linear transfer and at a stop.

Figure 4:
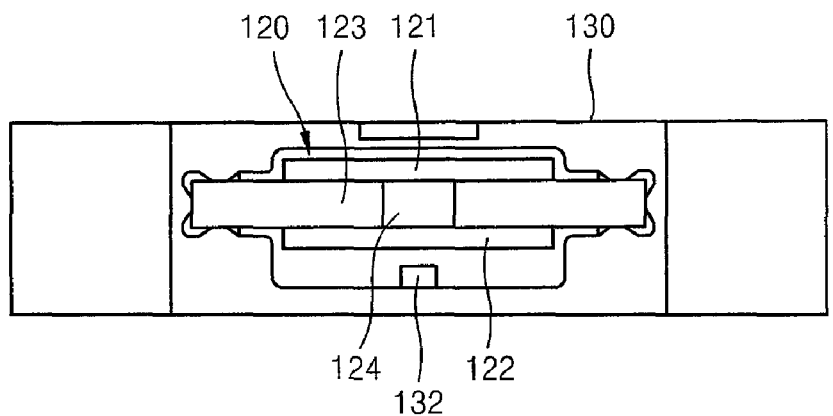
FIG. 4 is a diagram of the piezoelectric driving unit supported by a driving unit holder in the lens driving unit shown in FIG. 1, according to an embodiment of the present invention.
Figure 5:
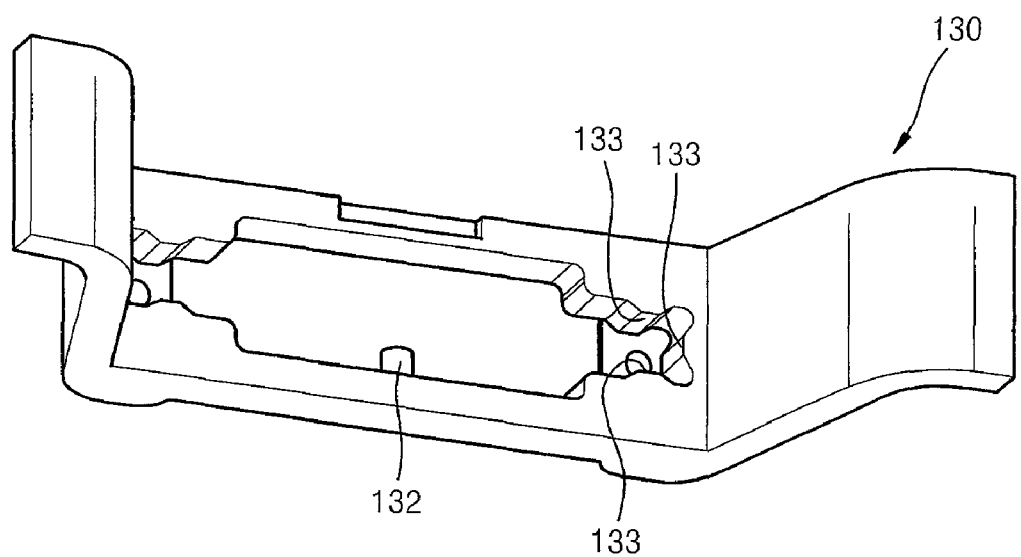
FIG. 5 is a diagram of the driving unit holder that supports the piezoelectric driving unit in the lens driving unit shown in FIG. 1, according to an embodiment of the present invention.

FIG. 4 is a diagram of the piezoelectric driving unit 120 supported by the driving unit holder 130 in the lens driving unit 100 shown in FIG. 1, according to an embodiment of the present invention. FIG. 5 is a diagram of the driving unit holder 130 that supports the piezoelectric driving unit 120 in the lens driving unit 100 shown in FIG. 1, according to an embodiment of the present invention.

Referring to FIGS. 4 and 5, the driving unit holder 130 may support both ends of the elastic element 123. When the elastic element 123 performs a bending motion, a part of the elastic element 123 supported by the driving unit holder 130 may slidably contact a part of the driving unit holder 130 supporting the elastic element 123.

In more detail, both ends of the elastic element 123 supported by the driving unit holder 130 are not fixed to the driving unit holder 130, so that the elastic element 123 may more flexibly perform the bending motion.

In this regard, the contacting unit 124 may be included in the part of the driving unit holder 130 supporting the elastic element 123. When the elastic element 123 performs the bending motion, the part of the elastic element 123 supported by the driving unit holder 130 may slidably contact the part of the driving unit holder 130 supporting the elastic element 123 through a line contact or a point contact by using the contacting unit 124.

Figure 6:
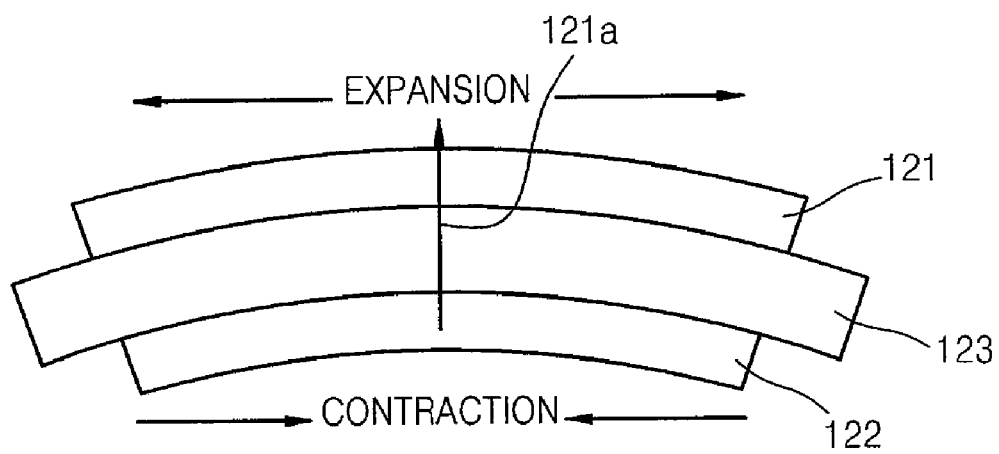
FIG. 6 is a diagram for explaining a driving principle of the piezoelectric driving unit shown in FIG. 3, according to an embodiment of the present invention.
Figure 7:
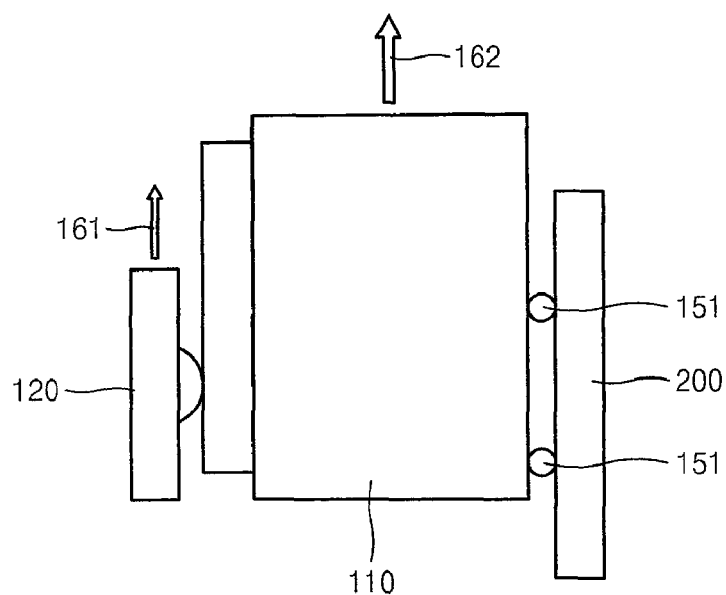
FIG. 7 is a diagram for explaining a principle for moving a lens carrier by using the piezoelectric driving unit in the lens driving unit shown in FIG. 1, according to an embodiment of the present invention.
Figure 8:
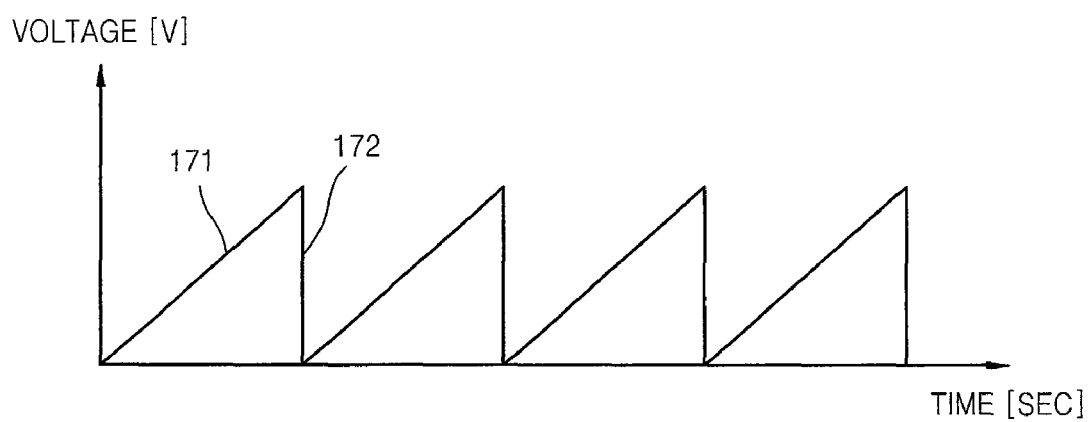
FIG. 8 is a driving waveform diagram of the piezoelectric driving unit used to move the lens carrier in the lens driving unit 100 shown in FIG. 1, according to an embodiment of the present invention.

FIG. 6 is a diagram for explaining a driving principle of the piezoelectric driving unit 120 shown in FIG. 3, according to an embodiment of the present invention. FIG. 7 is a diagram for explaining a principle for moving the lens carrier 110 by using the piezoelectric driving unit 120 in the lens driving unit 100 shown in FIG. 1, according to an embodiment of the present invention. FIG. 8 is a driving waveform diagram of the piezoelectric driving unit 120 used to move the lens carrier 110 in the lens driving unit 100 shown in FIG. 1, according to an embodiment of the present invention.

Referring to FIGS. 6 through 8, the piezoelectric driving unit 120 may be formed as a bimorph driving unit comprising the first and second piezoelectric elements 121 and 122 that are ultra-thin piezoelectric elements having two major axes and the elastic element 123 having the same width as the first and second piezoelectric elements 121 and 122 and longer than the first and second piezoelectric elements 121 and 122 in an axial direction. The first and second piezoelectric elements 121 and 122 may maintain contact with the upper and lower surfaces of the elastic element 123, respectively, in the form of a sandwich.

The first and second piezoelectric elements 121 and 122 may be formed of lead zirconate titanate (PZT) or formed in a multi-stack type. Alternatively, the first and second piezoelectric elements 121 and 122 may be formed of single-crystal lead magnesium niobate-lead titanate (PMN-PT).

The guide axis 112 may be attached to the lens carrier 110 in a direction of the thickness of the elastic element 123 disposed between the first and second piezoelectric elements 121 and 122.

To perform efficient driving, the first and second piezoelectric elements 121 and 122 may be electrically connected in parallel to each other. The first and second piezoelectric elements 121 and 122 may maintain the same dielectric direction, voltages may be applied to electrodes of the first and second piezoelectric elements 121 and 122, and the elastic element 123 formed of conductive metal may be ground connected.

If voltages are applied in parallel to the piezoelectric driving unit 120, a piezoelectric material having the same dielectric direction as the voltage direction is contracted, and a piezoelectric material having an opposite dielectric direction to the voltage direction is expanded. In this regard, if both ends of the piezoelectric driving unit 120 are supported, the piezoelectric driving unit 120 may generate a bending deformation and a maximum displacement along a central axis of the piezoelectric driving unit 120. If a direct current voltage having an optional waveform and having a different speed component from a resonance frequency is applied to the piezoelectric driving unit 120, the piezoelectric driving unit 120 in the central axis is repeatedly bent in an axial direction of the guide axis 112.

Referring to FIG. 6, the first piezoelectric element 121 is expanded, whereas the second piezoelectric element 122 is contracted. Thus, the piezoelectric driving unit 120 having both its ends supported generates the bending deformation in a direction 121a toward the first piezoelectric element 121.

In this regard, the contacting unit 124 is repeatedly bent in the axial direction of the guide axis 112, and repeatedly produces friction and slides on the guide axis 112, so that linear motions of a group of lenses may be generated by inertia, according to an application of a waveform, by receiving force from the piezoelectric driving unit 120.

Referring to FIG. 7, a driving direction 161 is determined by the piezoelectric driving unit 120, and a motion direction 162 is a direction in which the lens carrier 110 is transferred by using the piezoelectric driving unit 120. In this regard, a voltage having the driving waveform shown in FIG. 8 may be applied to the piezoelectric driving unit 120.

The driving waveform may be generated by each of the unit chopping waves that may each include a first step 171 and a second step 172. The piezoelectric driving unit 120 may be driven according to the sum of the continuous unit chopping waves. The first step 171 is a linearly increasing ramp waveform. The second step 172 is a directly falling waveform.

The contacting unit 124 and the guide axis 112 generate a friction motion according to the driving of the first step 171 and thus the lens carrier 110 may be transferred in a direction. The contacting unit 124 and the guide axis 112 generate a sliding motion according to the driving of the second step 172. Transfers are overlapped by each chopping wave so that the lens carrier 110 may be transferred as desired.

Figure 9:
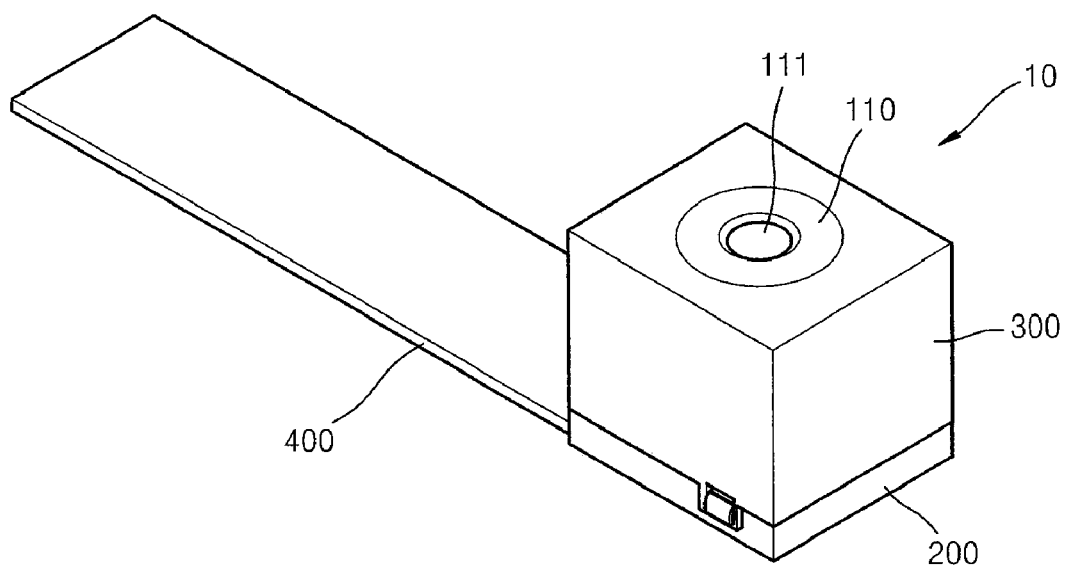
FIG. 9 is a perspective view of a camera module comprising the lens driving unit shown in FIG. 1, according to an embodiment of the present invention.
Figure 10:
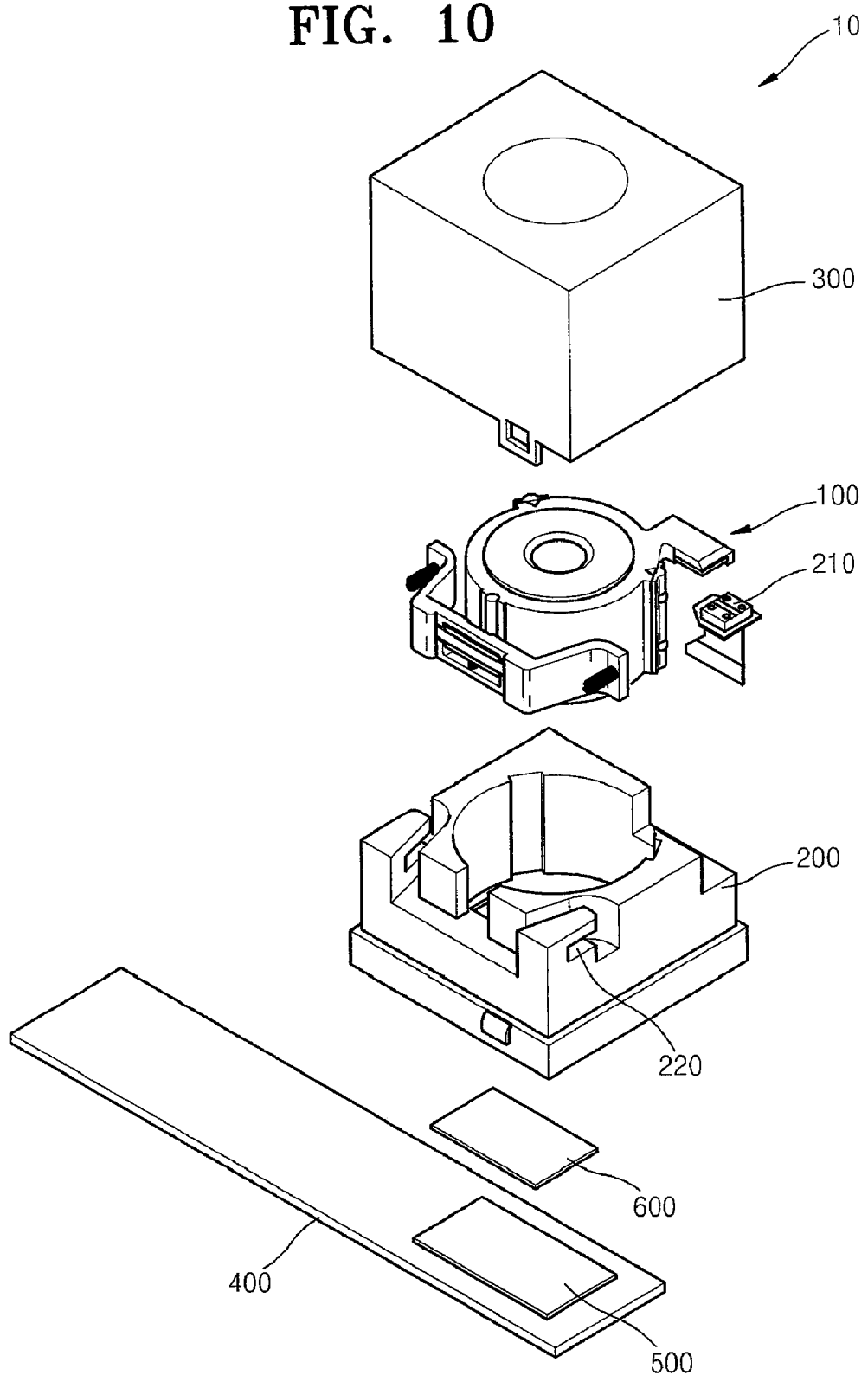
FIG. 10 is an exploded perspective view of the camera module comprising the lens driving unit shown in FIG. 1, according to an embodiment of the present invention.
Figure 11:
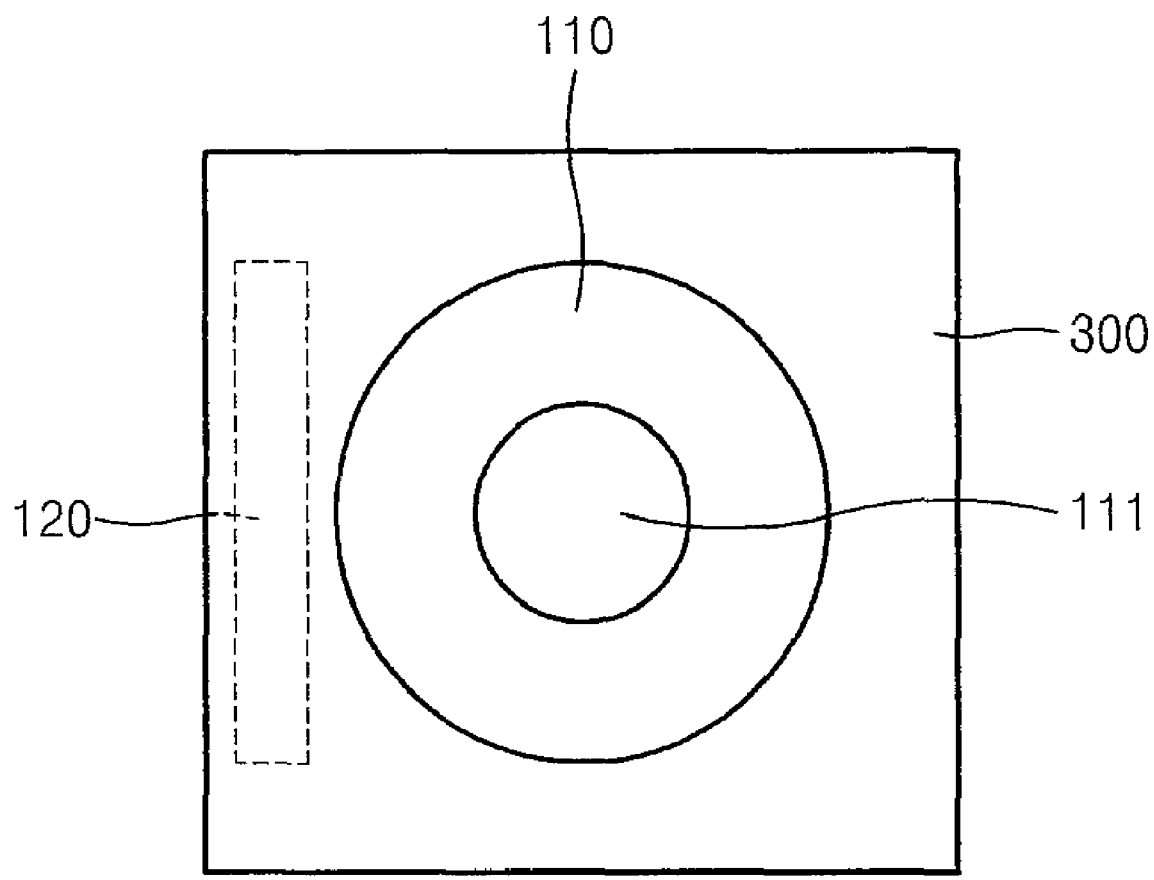
FIG. 11 is a diagram of a location where the piezoelectric driving unit is formed in a cover of the camera module shown in FIG. 9, according to an embodiment of the present invention.

FIG. 9 is a perspective view of a camera module 10 comprising the lens driving unit 100 shown in FIG. 1, according to an embodiment of the present invention. FIG. 10 is an exploded perspective view of the camera module 10 comprising the lens driving unit 100 shown in FIG. 1, according to an embodiment of the present invention. FIG. 11 is a diagram of a location where the piezoelectric driving unit 120 is formed in the cover 300 of the camera module 10 shown in FIG. 9, according to an embodiment of the present invention.

Referring to FIGS. 9 through 11, the camera module 10 may comprise the lens driving unit 100, the module base 200, the cover 300, a circuit substrate 400, and the image picking element 500.

The module base 200 may be disposed in the camera module 10 so as to move the lens carrier 110 in at least one direction. The cover 300 may be coupled to the module base 200, and may store the lens carrier 110 and the piezoelectric driving unit 120.

The circuit substrate 400 may be coupled to an opposite surface of the module base 200 to which the cover 300 is coupled. The image picking element 500 may be formed on a surface of the circuit substrate 400 to which the module base 200 is coupled.

The camera module 10 may further comprise an infrared rays preventing filter 600 that is directly attached to a surface of the image picking element 500 toward the lens 111 and prevents an infrared rays component from an incident light.

The reflective plate 115 is formed on the lens carrier 110. The sensor for detecting the location of the reflective plate 115 may be formed on the module base 200. In this regard, the lens carrier 110 may comprise the extension wing 114 that extends from the exterior surface of the lens carrier 110, and the reflective plate 115 may be formed on the bottom surface of the extension wing 114.

The module base 200 may comprise a sensor that is disposed in a location corresponding to the reflective plate 115 and detects the movement of the lens carrier 110. The sensor may be the photo reflector 210 comprising a light emitting unit and a light receiving unit.

The light emitting unit of the photo reflector 210 formed in the module base 200 emits light, the reflective plate 115 reflects the light, and the light receiving unit receives the light so that the location of the reflective plate 115 with regard to the photo reflector 210 is recognized. Thus, the relative location of the lens carrier 110 with respect to the module base 200 may be recognized with the photo reflector 210.

In particular, the reflective plate 115 is horizontally disposed, and the photo reflector 210 may be horizontally disposed in a location corresponding to the reflective plate 115, so that the location of the reflective plate 115 with respect to the photo reflector 210 is recognized according to the intensity of the light received by the light receiving unit.

Also, the driving unit holder 130 may comprise the first members 131 and the second member 132. The first member 131 is a projection unit disposed in a location where the side springs 141 are disposed and can be inserted into the side springs 141. The second member 132 is a projection unit disposed in a location where the lower spring 142 is disposed and can be inserted into the lower spring 142.

The module base 200 may comprise a first insertion groove 220. The first insertion grooves 220 are insertion grooves where the side springs 141 are inserted.

If the side springs 141 are inserted into the first insertion grooves 220 the first members 131 for supporting the side springs 141 may be formed in the first inserting grooves 220.

The camera module 10 uses a bimorph type piezoelectric actuator as the piezoelectric driving unit 120 of the lens carrier 110 so that the camera module 10 may be disposed between the exterior surface of the lens carrier 110 and the inner surface of the module base 200 with regard to the lens carrier 110 disposed in the module base 200.

In more detail, the piezoelectric driving unit 120 of the lens carrier 110 may be disposed in a location shown by a dotted line in FIG. 11 in a limited space between the exterior surface of the lens carrier 110 and the inner surface of the module base 200, thereby utilizing space in the lens driving unit 100 efficiently.

The lens carrier 110 is elastically supported by the side springs 141 and is guided by the ball bearings 151 and the ball bearing grooves 113, so that the lens carrier 110 is stably supported in the module base 200 and a horizontal level of the lens 111 is more stably maintained.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A lens driving unit, comprising:
   a lens carrier supporting a lens and comprising a guide axis exposed at least partially to the outside and extending in a direction substantially perpendicular to the lens; and
   a piezoelectric driving unit having a center portion contacting the guide axis according to a bending motion of a piezoelectric element and moving the lens carrier and the guide axis in a direction along which the guide axis extends;
   wherein the piezoelectric driving unit comprises:
      a first and second piezoelectric elements extending in a direction substantially perpendicular to the guide axis;
      an elastic element disposed between the first and second piezoelectric elements and extending in the direction substantially perpendicular to the guide axis; and
      a contacting unit disposed in a center portion of the elastic element and contacting the guide axis.

2. The lens driving unit of claim 1, wherein the first and second piezoelectric elements have substantially the same length, and
   wherein the elastic element is longer than the first piezoelectric element.

3. The lens driving unit of claim 1, further comprising: a driving unit holder supporting both ends of the elastic element, and
   wherein, during a bending motion of the elastic element, a part of the elastic element supported by the driving unit holder slidably contacts a part of the driving unit holder supporting the elastic element.

4. The lens driving unit of claim 3, further comprising: at least one side spring formed on the driving unit holder so as to elastically maintain contact of the contacting unit to the guide axis.

5. The lens driving unit of claim 1, further comprising: a lower spring formed on the first piezoelectric element or the second piezoelectric element so as to provide a restoring force with regard to the bending motion of the piezoelectric element.

6. The lens driving unit of claim 1, further comprising: a ball bearing spaced apart from the guide axis on an exterior surface of the lens carrier and guiding the lens carrier in the direction in which the guide axis extends.

7. The lens driving unit of claim 1, further comprising: a plurality of ball bearings and a plurality of ball grooves spaced apart from the guide axis on an exterior surface of the lens carrier and guiding the lens carrier in the direction in which the guide axis extends,
   wherein the plurality of the ball grooves are symmetrical to each other with regard to the guide axis.

8. The lens driving unit of claim 1, wherein the piezoelectric driving unit moves the lens carrier according to a repetitive bending motion of the piezoelectric element.

9. A lens driving unit, comprising:
   a lens carrier supporting a lens and comprising a guide axis exposed at least partially to the outside and extending in a direction substantially perpendicular to the lens;
   a piezoelectric driving unit having a center portion contacting the guide axis according to a bending motion of a piezoelectric element and moving the lens carrier and the guide axis in a direction along which the guide axis extends;
   an extension wing extending from the exterior surface of the lens carrier; and a reflective plate formed on the bottom surface of the extension wing that detects movement of the lens carrier with a sensor formed separate from the reflective plate.

10. A camera module, comprising:
a lens carrier supporting a lens and comprising a guide axis exposed at least partially to the outside of the lens carrier and extending in a direction substantially perpendicular to the lens;
a piezoelectric driving unit having a center portion contacting the guide axis according to a bending motion of a piezoelectric element and moving the lens carrier and the guide axis in a direction in which the guide axis extends; and
a module base supporting the piezoelectric driving unit and the lens carrier that allows the lens carrier to move in at least one direction;
wherein the piezoelectric driving unit comprises:
a first and second piezoelectric elements extending in a direction substantially perpendicular to the guide axis;
an elastic element disposed between the first and second piezoelectric elements and extending in the direction substantially perpendicular to the guide axis; and
a contacting unit disposed in a center portion of the elastic element and contacting the guide axis.

11. The camera module of claim 10, further comprising:
a driving unit holder supporting both ends of the elastic element and formed in the module base.

12. The camera module of claim 11, wherein, during a bending motion of the elastic element, a part of the elastic element supported by the driving unit holder slidably contacts a part of the driving unit holder supporting the elastic element.

13. The camera module of claim 11, further comprising: at least one side spring disposed between the module base and the driving unit holder so as to elastically maintain contact of the contacting unit to the guide axis.

14. The camera module of claim 13, further comprising: a lower spring disposed between the first piezoelectric element or the second piezoelectric element and the driving unit holder so as to provide a restoring force with regard to the bending motion of the piezoelectric element.

15. The camera module of claim 10, further comprising: a ball bearing spaced apart from the guide axis, between the lens carrier and the module base and guiding the lens carrier in the direction in which the guide axis extends.

16. The camera module of claim 10, further comprising: a plurality of ball bearings and a plurality of ball grooves spaced apart from the guide axis, between the lens carrier and the module base and guiding the lens carrier in the direction in which the guide axis extends, and
wherein the plurality of the ball grooves are symmetrical to each other with regard to the guide axis.

17. The camera module of claim 10, wherein the piezoelectric driving unit moves the lens carrier according to a repetitive bending motion of the piezoelectric element.

18. A lens driving unit, comprising:
a means for supporting a lens comprising a guide axis exposed at least partially to the outside and extending in a direction substantially perpendicular to the lens; and
a means for contacting the guide axis according to a bending motion thereby moving the means for supporting in a direction along which the guide axis extends
wherein the means for contacting the guide axis according to a bending motion comprises:
a first and second piezoelectric elements extending in a direction substantially perpendicular to the guide axis;
an elastic element disposed between the first and second piezoelectric elements and extending in the direction substantially perpendicular to the guide axis; and
a contacting unit disposed in a center portion of the elastic element and contacting the guide axis.

* * * * *